UNITED STATES PATENT OFFICE.

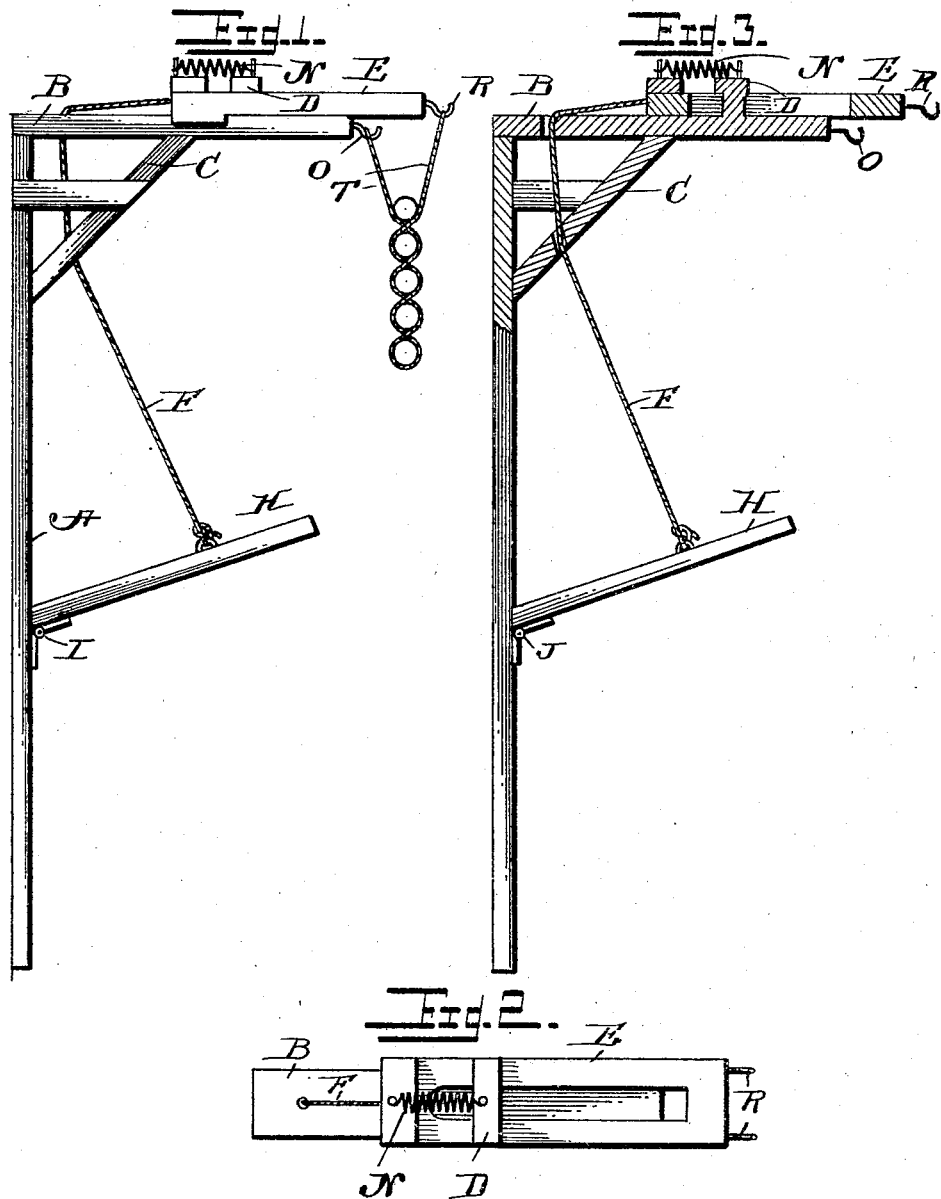

CORD McLAIN DAVIS, OF OAKWOOD, ILLINOIS.

DEVICE FOR TYING SEED-CORN.

1,290,923.　　　　　Specification of Letters Patent.　　Patented Jan. 14, 1919.

Application filed May 23, 1918.　Serial No. 236,196.

*To all whom it may concern:*

Be it known that I, CORD M. DAVIS, a citizen of the United States, residing at Oakwood, in the county of Vermilion and State of Illinois, have invented certain new and useful Improvements in Devices for Tying Seed-Corn; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for tying up seed corn, and consists in the provision of a simple and efficient device of this nature, having various details of construction, combinations and arrangements of parts which will be hereinafter fully described, shown in the accompanying drawings and then specifically defined in the appended claim.

My invention is illustrated in the accompanying drawings which, with the letters of reference marked thereon, form a part of this application and in which:

Figure 1 is a side elevation of the device.

Fig. 2 is a top plan view, and

Fig. 3 is a sectional view vertically through the upper portion of the device.

Reference now being had to the details of the drawings by letters:

A designates a post having a laterally extending arm B therefrom, and C is a brace for holding said arm in a horizontal position. Said arm has a T-shaped extension D upon the top and E is a sliding plate mounted upon said arm and having a slot adapted to receive the shank portion of the extension D. A rope F is fastened at one end to the inner part of said plate and passes through an aperture in the arm, and its lower end is fastened to the foot treadle H, which is hinged to said post at I. A coiled spring N is fastened at one end to the T-shaped extension D and at its other end to a block which is fastened to the rear end of the plate. The purpose of said spring is to normally return the plate to its farthest outer limit, after having been moved to its farthest inner limit. At the end of said arm are two hooks O, and similar hooks R project from the outer end of the plate. Tying cords T are caught over the hooks R and O and hang down to receive the cobs of corn.

In operation an ear of corn is placed in the loops formed by the cords, and the operator by depressing the treadle H may cause the plate E to be drawn horizontally, the cords intersecting across the cob of corn. Another cob is then placed above the first one and pressure from the lever H is released and the spring connected to the plate E will cause the latter to move back to its outer normal position, the cords again intersecting over the second cob. Each time the plate moves to its limit in one direction an additional cob is placed above the intersecting portions of the cord. This operation continues until a series of cobs is tied up by the cords in the manner shown and described.

What I claim to be new is:

A device for tying ears of seed corn comprising a standard with a laterally projecting arm at its upper end with an upright guiding projection, a plate having a longitudinal slot to receive said projection and mounted to move horizontally upon said arm, the under-surface of the plate having outwardly projecting portions engaging the opposite edges of the arm, a spring fastened at one end to the inner end of the plate and at its other end to said arm, hooks at the ends of said arm and plate, cords fastened to said hooks and adapted to intersect each other as the plate is moved longitudinally in opposite directions, a treadle hinged to said standard, and a rope fastened at one end to said treadle, passing through apertures of the standard and secured to the inner end of said plate.

In testimony whereof I hereunto affix my signature in presence of two witnesses.

CORD. McLAIN DAVIS.

Witnesses:
M. S. CAMPBELL,
A. J. DAVIS.